(12) United States Patent
Charnay et al.

(10) Patent No.: US 12,396,543 B2
(45) Date of Patent: Aug. 26, 2025

(54) COSMETIC PRODUCT APPLICATOR, COSMETIC PRODUCT PACKAGING ASSEMBLY AND ASSOCIATED MANUFACTURING PROCESSES

(71) Applicant: L'OREAL, Paris (FR)

(72) Inventors: Patrick Charnay, Clichy (FR); Pierre Gardet, Clichy (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 18/565,133

(22) PCT Filed: Jun. 9, 2022

(86) PCT No.: PCT/EP2022/065689
§ 371 (c)(1),
(2) Date: Nov. 29, 2023

(87) PCT Pub. No.: WO2022/258751
PCT Pub. Date: Dec. 15, 2022

(65) Prior Publication Data
US 2024/0251930 A1    Aug. 1, 2024

(30) Foreign Application Priority Data

Jun. 10, 2021  (FR) ...................................... 2106132

(51) Int. Cl.
*A45D 40/26* (2006.01)
*B29C 45/00* (2006.01)
(Continued)

(52) U.S. Cl.
CPC ........ *A45D 40/265* (2013.01); *B29C 45/0001* (2013.01); *B29C 45/2612* (2013.01);
(Continued)

(58) Field of Classification Search
CPC ................ A45D 40/265; A45D 40/262; B29C 45/0001; B29C 45/262; B29C 45/2612;
(Continued)

(56) References Cited

U.S. PATENT DOCUMENTS 8,783,988 B2 * 7/2014 Sanchez ................. A45D 34/04
401/109
10,178,905 B2   1/2019 Sanchez et al.
(Continued)

FOREIGN PATENT DOCUMENTS

FR    2987244 A1    8/2013
FR    3142871 A1 *  6/2024 ........... A45D 40/267
(Continued)

OTHER PUBLICATIONS

International Search Report and Written Opinion issued on Sep. 26, 2022 for corresponding PCT Application No. PCT/EP2022/065689.
(Continued)

*Primary Examiner* — Jennifer C Chiang
(74) *Attorney, Agent, or Firm* — POLSINELLI PC

(57) ABSTRACT

A cosmetic product application member comprises:
a rod carrier (40); and
a rod (38) defining a first end (70) and a second end (72) that are opposite.

(Continued)

The first end (70) of the rod (38) is intended to be assembled in the rod carrier (40). The rod (38) and the rod carrier (40) are manufactured from a plastic material composed of a copolyester, in particular a semi-aromatic copolyester.

17 Claims, 5 Drawing Sheets

(51) Int. Cl.
   *B29C 45/26* (2006.01)
   *B29K 67/00* (2006.01)
   *B29L 31/00* (2006.01)

(52) U.S. Cl.
   CPC ........ *B29C 45/2618* (2013.01); *B29C 45/262* (2013.01); *A46B 2200/1046* (2013.01); *A46B 2200/1053* (2013.01); *A46B 2200/1066* (2013.01); *B29K 2067/003* (2013.01); *B29L 2031/718* (2013.01)

(58) Field of Classification Search
   CPC ........ B29C 45/2618; A46B 2200/1046; A46B 2200/1053; A46B 2200/1066; B29K 2067/003
   See application file for complete search history.

(56) References Cited

U.S. PATENT DOCUMENTS

| | | |
|---|---|---|
| 2005/0249538 A1 | 11/2005 | Patel |
| 2009/0065020 A1 | 3/2009 | Butcher et al. |
| 2017/0367463 A1 | 12/2017 | Leonard |
| 2019/0000212 A1* | 1/2019 | Balestrini ............ A45D 34/043 |
| 2019/0000222 A1 | 1/2019 | Balestrini et al. |
| 2019/0239621 A1 | 8/2019 | Leonard |
| 2020/0085169 A1 | 3/2020 | Maurin et al. |

FOREIGN PATENT DOCUMENTS

| | | |
|---|---|---|
| JP | 2015006246 A | 1/2015 |
| JP | 5805959 B2 | 11/2015 |
| WO | 2013118556 A1 | 8/2013 |
| WO | 2019043955 A1 | 3/2019 |

OTHER PUBLICATIONS

Preliminary Search Report issued on Mar. 6, 2022 for corresponding French Application No. 2106132.

* cited by examiner

COSMETIC PRODUCT APPLICATOR, COSMETIC PRODUCT PACKAGING ASSEMBLY AND ASSOCIATED MANUFACTURING PROCESSES

CROSS REFERENCE TO RELATED APPLICATIONS

This application is a National Phase filing under 35 U.S.C. § 371 of PCT/EP2022/065689, filed on Jun. 9, 2022, which in turn claims priority to French Application No. 2106132, filed Jun. 10, 2021, disclosures of which are incorporated herein by reference in their entireties.

The present invention relates to a cosmetic product application member comprising a rod carrier and a rod defining a first end and a second end that are opposite.

A cosmetic product is in particular a product as defined in EC Regulation N° 1223/2009 of the European Parliament and the Council of Nov. 30, 2009, relating to cosmetic products. For example, the cosmetic product is a coloring, make-up or care product, such as lip gloss or mascara.

The cosmetic product is generally contained in a receptacle or a flask equipped with a cosmetic product application member capable of extracting a quantity of cosmetic product and applying said quantity of product on a body surface, so as to obtain the desired effect.

The application member generally comprises a rod intended to carry an applicator intended to reach the base of the receptacle and a rod carrier intended to mount the rod on the receptacle.

It is known to manufacture such application members in one piece molded in a plastic material, such as for example polyoxymethylene (POM).

However, the plastic materials which are simple and inexpensive to mold such as POM have no recycling processes allowing reuse of the application member which protects the environment.

Plastic materials composed of a copolyester, such as polyethylene terephthalate (PET) for example, offer the advantage of being easy to recycle and having well-established industrial recycling processes.

However, the manufacture of an application member by molding a copolyester is costly in cycle time, due to the substantial cooling time of such a material. For want of such cooling, the released product is relatively soft, which causes problems in terms of the mechanical strength thereof and meeting the desired dimensional specifications.

Such a manufacture is therefore expensive and unsuitable for mass production.

The problems caused by the substantial cooling time of copolyesters are particularly important in the context of molding an elongated element, such as a rod, released by moving a mold along the longitudinal axis thereof; indeed, in the absence of complete cooling of the elongated element, the latter will tend to adhere to the walls of the mold and elongate during such a mold release operation, resulting in a failure to comply with the manufacturing dimensions sought, or even impossible mold release.

An aim of the invention is that of providing a cosmetic product application member made of an easy-to-recycle material, while remaining simple and inexpensive to manufacture, and meeting the desired dimensional specifications.

For this purpose, the invention relates to a cosmetic product application member of the type cited above, characterized in that the first end of the rod is intended to be assembled in the rod carrier, the rod and the rod carrier being manufactured from a plastic material composed of a copolyester, in particular a semi-aromatic copolyester.

Such an application member is manufactured from an easy-to-recycle material that has well-established industrial recycling processes. Manufacturing such an application member in two parts offers the advantage of remedying the problem of the substantial cooling time and therefore of expensive manufacture. Indeed, by designing the application member in two parts, the rod and the rod carrier can be manufactured, and in particular molded, separately, in molding devices adapted to the geometry thereof, particularly enabling optimal cooling at least cost in terms of cycle time of the molded copolyester material. Such an application member is thus simple and inexpensive to manufacture, while ensuring that it meets the desired dimensional specifications.

In a specific embodiment of the invention, the plastic material is composed of virgin polyethylene terephthalate (PET), recycled PET or a combination of virgin PET and recycled PET, and preferably more than 90% recycled PET.

Such a material has good mechanical properties and offers the advantage of having a very well-established industrial recycling process. The application member can thus be manufactured solely from recycled materials.

In a specific embodiment of the invention, the first end of the rod is intended to be snap-locked into the rod carrier.

Snap-locking the rod in the rod carrier enables reliable fastening of the rod in the rod carrier, while remaining simple to carry out. The embodiment of the application member in two parts, making it possible to obtain a rod carrier and a rod of precise geometries, is especially advantageous in the context of a rod assembled by snap-locking on the rod carrier, the reliability of such an assembly device being conditional on complying with precise manufacturing tolerances for these two elements.

In a specific embodiment of the invention, the rod carrier comprises:
 a screwing ring centered on a rod carrier axis and defining an internal thread; and
 a cylindrical skirt centered on the rod carrier axis, extending at least partially inside the screwing ring and intended to receive the first end of the rod.

In a specific embodiment of the invention, the cylindrical skirt comprises a protuberance centered on the rod carrier axis, protruding inside the cylindrical skirt and defining at least one retaining housing intended to receive at least one tenon arranged at the first end of the rod.

In a specific embodiment of the invention, the cylindrical skirt comprises longitudinal ribs arranged along at least a portion of an inner surface of the cylindrical skirt, the rod comprising at least one longitudinal protrusion capable of engaging between two adjacent longitudinal ribs of the cylindrical skirt.

Such a structure of the rod carrier and rod is adapted for snap-locking the rod in the rod carrier, while enabling fastening to a cosmetic product packaging assembly.

The invention also relates to a cosmetic product packaging assembly comprising:
 a receptacle intended to receive the cosmetic product and defining an opening;
 a cover intended to close the opening; and
 a cosmetic product application member as defined above, the rod carrier being intended to be fastened in the cover.

In a specific embodiment of the invention, the receptacle, the cover, the rod carrier and the rod are manufactured from the same material.

Manufacturing the elements of the cosmetic product packaging assembly from the same material enables simplified recycling thereof.

The invention also relates to a process for manufacturing a rod carrier, the rod carrier being intended to be assembled with a rod to form a cosmetic product application member, the manufacturing process including the following steps:

providing a rod carrier molding device comprising a die and a central spindle and defining a rod carrier molding cavity; and injecting a fluid material into the molding cavity;

solidifying the fluid material in the molding cavity to form the rod carrier.

The fluid material injected into the molding cavity is a copolyester, particularly a semi-aromatic copolyester.

In a specific embodiment of the invention, during the solidification step, the central spindle is cooled by injecting a coolant into a channel defined inside the central spindle.

Such cooling of the central spindle makes it possible to cool the fluid material injected into the molding cavity effectively and thus reduce the solidification time thereof. The rod carrier thus obtained is produced at a low cost in terms of cycle time, while ensuring that the desired dimensional specifications are met.

In a specific embodiment of the invention, the molding device further comprises a threaded spindle; during the solidification step, the threaded spindle being cooled by thermal contact with the central spindle.

The injected fluid material is composed of virgin polyethylene terephthalate, recycled PET or a combination of virgin PET and recycled PET, and preferably more than 90% recycled PET.

The invention also relates to a process for manufacturing a cosmetic product application member including the following steps:

manufacturing a rod carrier according to the manufacturing process described above;

providing a rod defining a first end and a second end that are opposite, the rod being composed of the same material as the rod carrier; and assembling the first end of the rod in the rod carrier.

In a specific embodiment of the invention, the first end of the rod is snap-locked into the rod carrier.

The rod is molded flat beforehand.

Such flat molding of the rod, which is presented in the form of an elongated element, is particularly advantageous in terms of investment, the mold used being of simple design, for example in two shells, and in terms of cooling time required for mold release without adhesion of the molded copolyester material to the walls of the mold and meeting the desired manufacturing dimensions.

Indeed, in the case of flat molding of an elongated element, mold release is performed by moving the mold parts in an orthogonal direction to the longitudinal axis of the molded elongated element and not along this longitudinal axis. This prevents the pitfall of stretching the rod along the longitudinal axis thereof during mold release, due to the phenomenon of adhesion of the material to the walls of a mold moving along this longitudinal axis. Moreover, a device for flat molding such an elongated element is relatively easy to cool, which further reduces the cooling time needed to obtain a rod of precise geometry after mold release.

The invention will be easier to understand after reading the following description, provided solely as an example, and with reference to the appended drawings, wherein.

Figure 1:
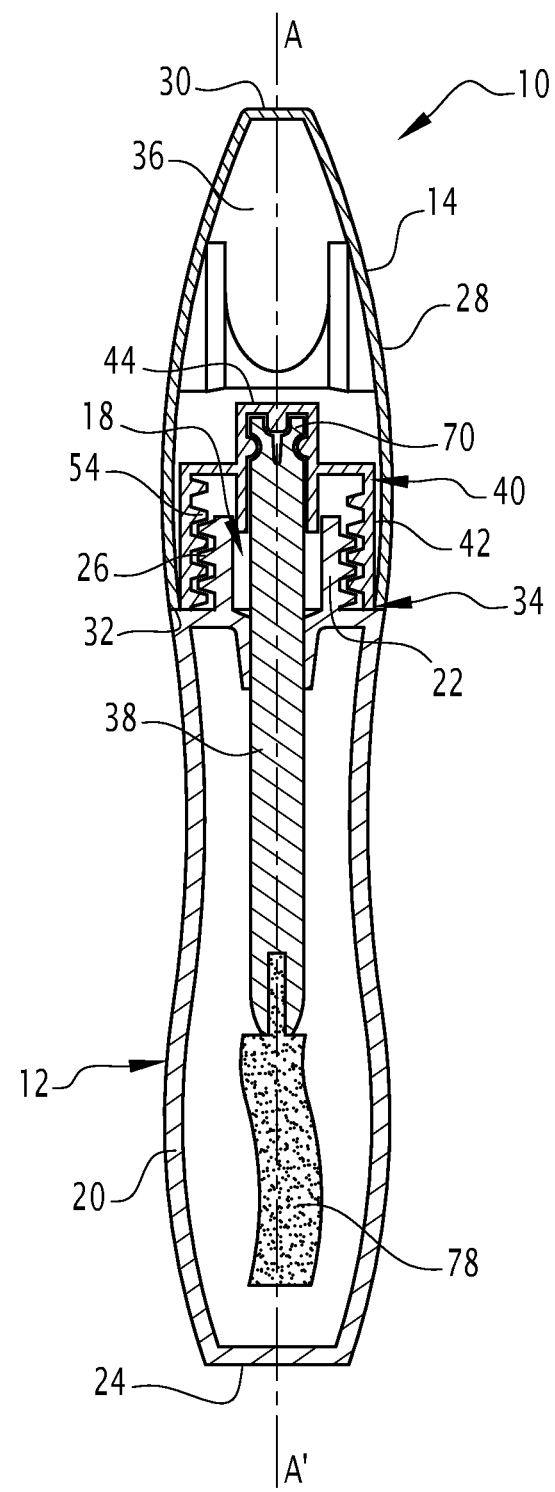
FIG. 1 is a cross-section along an axial midplane of a cosmetic product packaging assembly comprising a cosmetic product application member according to the invention.

FIG. 1 illustrates a cosmetic product packaging assembly 10 comprising a receptacle 12, a cover 14 and a cosmetic product application member 16.

The cosmetic product intended to be packaged with the assembly 10 is for example, a cosmetic care, coloring or make-up product. It is presented in liquid or pasty form. The cosmetic product is for example a mascara, a lip gloss, or a nail varnish.

The receptacle 12 is intended to receive said cosmetic product and defines an opening 18.

The receptacle 12 is for example a flask or a bottle.

The receptacle 12 extends longitudinally along a main axis A-A'. Under normal conditions of use, the main axis A-A' corresponds to a top-bottom axis.

The receptacle 12 comprises a side wall 20, a neck 22 and a base 24 located opposite the neck 22.

The side wall 20 is a hollow tube of main axis A-A', as illustrated in FIG. 1.

The volume defined inside the side wall 20, delimited at the top by the neck 22 and the bottom by the base 24 is capable of receiving the cosmetic product.

The internal volume of the receptacle 12 has for example a capacity between 4 mL and 20 mL.

As illustrated in FIG. 1, the neck 22 defines the opening 18, which is advantageously centered on the main axis A-A', and which opens at the top.

The opening 18 is for example of circular shape of diameter between 3 mm and 15 mm.

The neck 22 is advantageously cylindrical of circular cross-section centered on the main axis A-A'.

An external thread 26 is advantageously arranged on the neck 22 as illustrated in FIG. 1.

The receptacle 12 is for example made of plastic manufactured by plastic injection or blowing.

Preferably, the receptacle 12 is manufactured from a plastic material composed of a copolyester, particularly a semi-aromatic copolyester and more particularly from a plastic material composed of virgin polyethylene terephthalate (PET), recycled PET or a combination of virgin PET and recycled PET, and preferably more than 90% recycled PET.

The cover 14 is intended to close the opening 18 defined in the neck 22 of the receptacle 12.

The cover 14 extends longitudinally along a main axis, which is merged with the main axis A-A', when the cover 14 closes the opening 18 as illustrated in FIG. 1.

The cover 14 comprises a side wall 28, a closing wall 30 located at a first end of the cover 14 located away from the receptacle 12, and an annular shoulder 32 located at a second end of the cover 14 and defining an opening 34.

The cover 14 is advantageously hollow and defines an inner volume 36 inside the side wall 28, delimited at the top by the closing wall 30 and open at the bottom via the opening 34.

When the cover 14 closes the opening 18, the shoulder 32 is in contact with the receptacle 12 and the neck 22 is located in the inner volume 36 of the cover 14.

The opening 34 defined by the shoulder 32 is for example of circular shape of diameter between 4 mm and 15 mm.

The cover 14 is for example manufactured by plastic injection or blowing.

Advantageously, the cover 14 is manufactured from the same material as the receptacle 12, and preferably from a plastic material composed of a copolyester, particularly a semi-aromatic copolyester and more particularly from a plastic material composed of virgin PET, recycled PET or a combination of virgin PET and recycled PET, and preferably more than 90% recycled PET.

The cosmetic product application member 16 comprises a rod 38 intended to be inserted into the receptacle 12 and a rod carrier 40 intended to carry the rod 38, while being assembled with the cover 14.

As seen hereinafter, the rod 38 and the rod carrier 40 are made of two separate parts assembled with one another. They are each made of a plastic material composed of a copolyester, particularly a semi-aromatic copolyester and more particularly of a plastic material composed of virgin PET, recycled PET or a combination of virgin PET and recycled PET, and preferably more than 90% recycled PET.

The cosmetic product application member 16 is movably mounted through the opening 18 along an insertion direction between an extraction position and an application position.

The insertion direction extends for example along the main axis A-A' of the receptacle 12.

In the extraction position, as illustrated in FIG. 1, the cosmetic product application member 16 is located inside the receptacle 12 so as to be at least partially in contact with the cosmetic product.

In the sampling position, the cover 14 closes the opening 18 and the rod 38 is located inside the receptacle 12.

In the application position, the cover 14 leaves the opening 18 of the receptacle 12 free and open, the cosmetic product application member 16 is extracted from the receptacle 12 and is capable of being moved in the vicinity of or in contact with a body surface, with a view to applying an extracted quantity of cosmetic product thereon.

The rod carrier 40 is fastened in the cover 14, such that the application member 16 is integral with the cover 14.

As illustrated in FIG. 1, the rod carrier 40 is inserted into the inner volume 36 via the opening 34 of the cover 14.

Once fastened, the rod carrier 40 is disposed bearing laterally on the inner surface of the side wall 28 of the cover 14.

Figure 2:
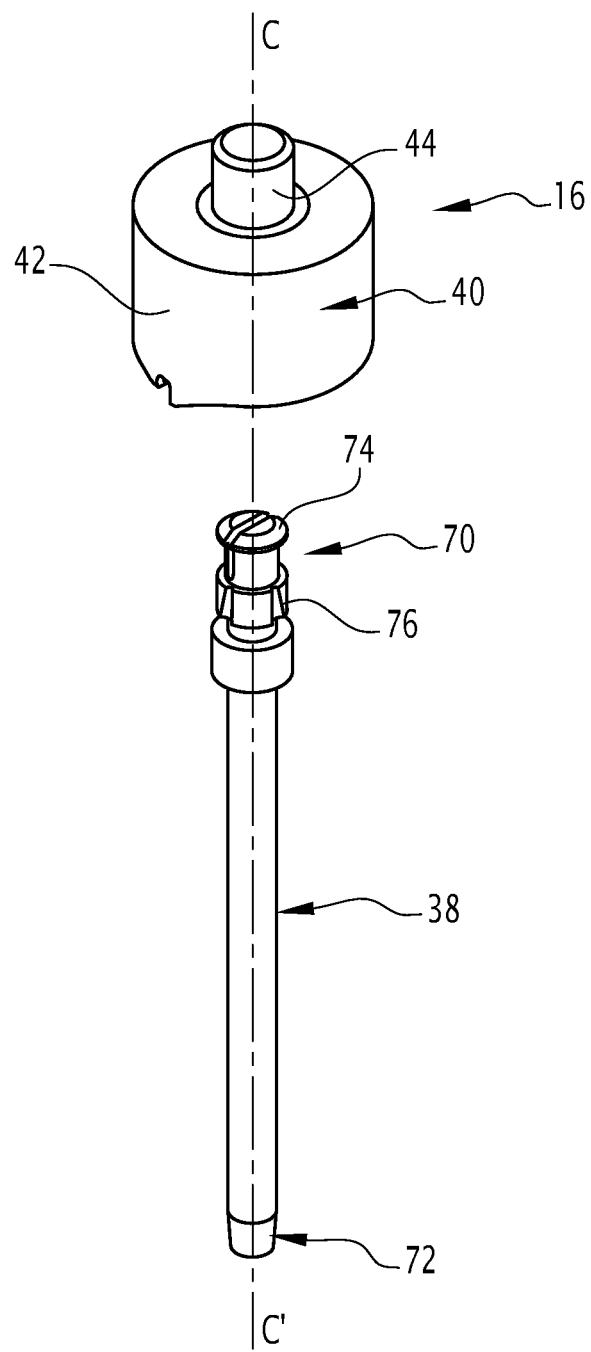
FIG. 2 is an exploded view of the cosmetic product application member in FIG. 1 comprising a rod carrier and a rod.
Figure 3:
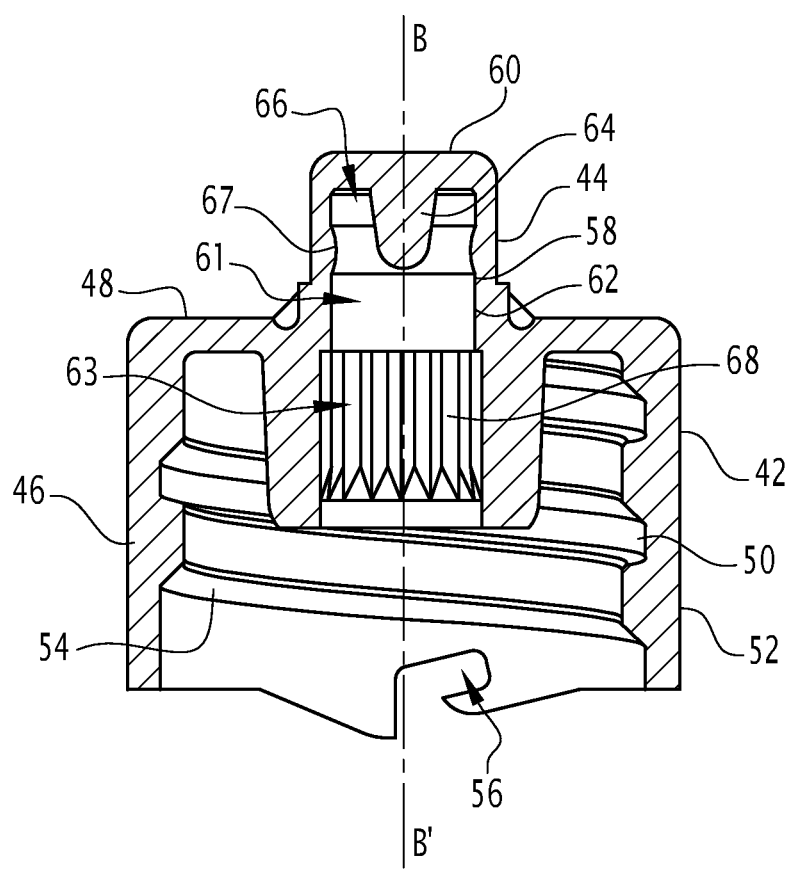
FIG. 3 is a cross-section along an axial midplane of the rod carrier in FIG. 2.

In the example illustrated in FIGS. 2 and 3, the rod carrier 40 comprises a screwing ring 42 and a cylindrical upper skirt 44 inserted through the screwing ring 42.

The screwing ring 42 is centered on a rod carrier axis B-B' and comprises a side wall 46 and an upper wall 48.

The side wall 46 is a hollow sleeve centered on the rod carrier axis B-B'. It defines the inner surface 50 and an outer surface 52 which are substantially cylindrical.

The screwing ring 42 is intended to be screwed onto the neck 22 of the receptacle 12, such that the cover 14, wherein the rod carrier 40 is mounted, closes the opening 18.

For this purpose, the screwing ring 42 defines an internal thread 54 capable of being screwed onto the external thread 26 of the neck 22 of the receptacle 12.

As illustrated in FIG. 3, the internal thread 54 is defined on the inner surface 50 of the side wall 46.

The outer surface 52 of the side wall 46 of the screwing ring 42 is intended to bear laterally on the inner surface of the side wall 28 of the cover 14, so as to fasten the rod carrier 40 into the cover 14.

The screwing ring 42 has for example an inner diameter substantially equal to the diameter of the opening 18 of the receptacle 12 and an outer diameter substantially equal to the diameter of the opening 34 of the cover 14.

When the screwing ring 42 is screwed onto the neck 22 of the receptacle 12, the rod carrier axis B-B' is substantially merged with the main axis A-A'.

Advantageously, as illustrated in FIG. 3, a hook 56 is arranged on the screwing ring 42. The hook 56 is capable of snap-locking onto a stop defined for example on the neck 22 of the receptacle 12. At the end of the screwing travel of the screwing ring 42 on the neck 22, such snap-locking makes it possible to offer the user an audible and tactile closing sensation.

The cylindrical skirt 44 is centered on the rod carrier axis B-B' and comprises a side partition 58 and an upper partition 60.

The side partition 58 is a hollow tube centered on the rod carrier axis B-B' and defines a substantially cylindrical inner surface 62.

The cylindrical skirt 44 extends at least partially inside the screwing ring 42.

More particularly, as illustrated in FIG. 3, the upper partition 60 of the cylindrical skirt 44 extends substantially parallel with the upper wall 48 of the screwing ring 42 and away therefrom.

The cylindrical skirt 44 comprises an upper part 61, wherein the side partition 58 protrudes upwards to the upper partition 60 of the cylindrical skirt 44 beyond the upper wall 48 of the screwing ring 42. It connects the cylindrical skirt 44 and the screwing ring 42.

The cylindrical skirt 44 also comprises a lower part 63, wherein the side partition 58 extends protruding downwards inside the screwing ring 42.

The cylindrical skirt 44 has for example an outer diameter less than the diameter of the screwing ring 42, and particularly between 3 mm and 10 mm.

As illustrated in FIG. 3, the cylindrical skirt 44 further comprises a protuberance 64 centered on the rod carrier axis B-B', protruding toward the inside of the cylindrical skirt 44 and defining at least one retaining housing 66.

More particularly, the protuberance 64 is arranged under the upper partition 60 and has a rounded tip centered on the rod carrier axis B-B'.

The cylindrical skirt 44 also advantageously comprises an annular retaining bead 67 protruding from the side partition 58 toward the inside of the cylindrical skirt 44.

As illustrated in FIG. 3, the retaining housing 66 has an annular shape. It is delimited laterally between the protuberance 64 and the side partition 58 and is delimited along the rod carrier axis B-B' between the annular retaining bead 67 and the upper partition 60 of the cylindrical skirt 44. The retaining housing 66 is for example defined at the upper part 61 of the cylindrical skirt 44.

The cylindrical skirt 44 further comprises longitudinal ribs 68 arranged on at least a portion of the inner surface 62 of the cylindrical skirt 44.

The longitudinal ribs 68 extend along a parallel direction with the rod carrier axis B-B', and for example as illustrated in FIG. 3, only on the lower part 63 of the cylindrical skirt 44.

The rod carrier 40 is for example manufactured by plastic injection molding.

Preferably, the rod carrier 40 is manufactured from a plastic material composed of a copolyester, particularly a semi-aromatic copolyester and more particularly from a plastic material composed of virgin PET, recycled PET or a combination of virgin PET and recycled PET, and preferably more than 90% recycled PET.

Advantageously, the rod carrier 40 is manufactured from the same material as the receptacle 12 and the cover 14.

As illustrated in FIG. 2, the rod 38 extends in a rectilinear manner along a rod axis C-C'.

The rod 38 defines, along the rod axis C-C', a first end 70 and a second end 72 opposite the first end 70.

The first end 70 of the rod 38 is intended to be assembled in the rod carrier 40, as illustrated in FIG. 1.

More particularly, the first end 70 of the rod 38 is intended to be snap-locked in the rod carrier 40.

In other words, the rod carrier 40, and more particularly the cylindrical skirt 44 of the rod carrier 40, is capable of receiving the first end 70 of the rod 38 and locking it in position.

For this purpose, the retaining housing 66 defined in the cylindrical skirt 44 of the rod carrier 40 is intended to receive two tenons 74 arranged at the first end 70 of the rod 38.

The two tenons 74 extend along a parallel direction with the rod axis C-C' and give the first end 70 of the rod 38 a fork shape.

More particularly, during the insertion of the first end 70 of the rod 38 in the cylindrical skirt 44, the tenons 74 are capable of being deformed elastically toward the rod axis C-C', so as to be housed in the retaining housing 66, then return to an idle position, wherein each tenon 74 is locked thus in the retaining housing 66. Such shape cooperation locks the first end 70 of the rod 38 in position in the rod carrier 40.

When the rod 38 is assembled in the rod carrier 40, the rod carrier axis B-B' and the rod axis C-C' are substantially merged.

Advantageously, the rod 38 further comprises longitudinal protrusions 76 arranged on the first end 70 of the rod 38, below the tenons 74.

The longitudinal protrusions 76 extend along a parallel direction with the rod axis C-C.

The longitudinal protrusions 76 are capable of being housed between longitudinal ribs 68 of the rod carrier 40 when the first end 70 of the rod 38 is assembled in the rod carrier 40.

Such an assembly of the protrusions 76 in the ribs 68 locks the rotation of the rod 38 in the rod carrier 40, which could damage the snap-locking connection between the rod 38 and the rod carrier 40, particularly when screwing and unscrewing the screwing ring 42 on the neck 22 of the receptacle 12.

Alternatively, the assembly of the first end 70 of the rod 38 in the rod carrier 40 is performed by welding, particularly by ultrasonic welding.

The rod 38 is for example manufactured from a plastic material composed of a copolyester, particularly a semi-aromatic copolyester and more particularly from a plastic material composed of virgin PET, recycled PET or a combination of virgin PET and recycled PET, and preferably more than 90% recycled PET.

Advantageously, the rod 38 is manufactured from the same material as the rod carrier 40, and preferably as the receptacle 12 and the cover 14.

The cosmetic product application member 16 further comprises an applicator 78 fastened at the second end 72 of the rod 38.

The applicator 78 is capable of extracting a quantity of cosmetic product and applying said quantity of product on a body surface so as to obtain the desired effect.

The applicator 78 is adapted to the cosmetic product to be applied.

The applicator 78 is for example a mascara brush as illustrated in FIG. 1, or is for example a flocked brush intended to apply lip gloss.

A rod carrier molding device 80 intended to mold the rod carrier 40 will now be described with reference to FIG. 4.

The molding device 80 comprises a die 82, a central spindle 84, a peripheral threaded spindle 86, two deux carriages 88 and a steady 90. It defines a molding cavity 92 of the rod carrier 40.

The molding cavity 92 has a shape and size conjugated with the rod carrier 40.

The molding cavity 92 comprises an upper face 94 defining the outer contour of the rod carrier 40 and a lower face 96 defining the inner contour of the rod carrier 40.

The molding cavity 92 is centered on a central axis D-D'.

Under normal conditions of use, the central axis D-D' corresponds to a top-bottom axis of the molding device 80.

The molding cavity 92 is capable of receiving a fluid plastic material injected using a nozzle (not illustrated) and which, on solidifying, forms a rod carrier 40.

The die 82 is movable in translation along the central axis D-D'.

The upper face 94 of the molding cavity 92 is arranged in said die 82.

The central spindle 84 extends along the central axis D-D' and comprises an upper end 98 defining at least partially the lower face 96 of the molding cavity 92.

The central spindle 84 is movable in translation without rotation along the central axis D-D' and to define the molding cavity 92, the central spindle 84 is capable of being inserted along the central axis D-D' in the direction of the die 82.

Optionally, an end piece 100 is fastened at the upper end 98 of the central spindle 84. Such an end piece 100 makes it possible for example to define the complex shape of the cylindrical skirt 42 of the rod carrier 40.

According to the invention, a channel 102 is defined inside the central spindle 84.

The channel 102 is fluidically connected to a coolant source, in particular to a source of water at a temperature less than 40° C.

The channel 102 extends along the central axis D-D' toward the upper end 98 of the central spindle 84.

The threaded spindle 86 has a hollow cylindrical shape centered on the central axis D-D' and comprises an upper end 104 capable of defining the internal thread 54 of the screwing ring 42 of the rod carrier 40.

Figure 4:
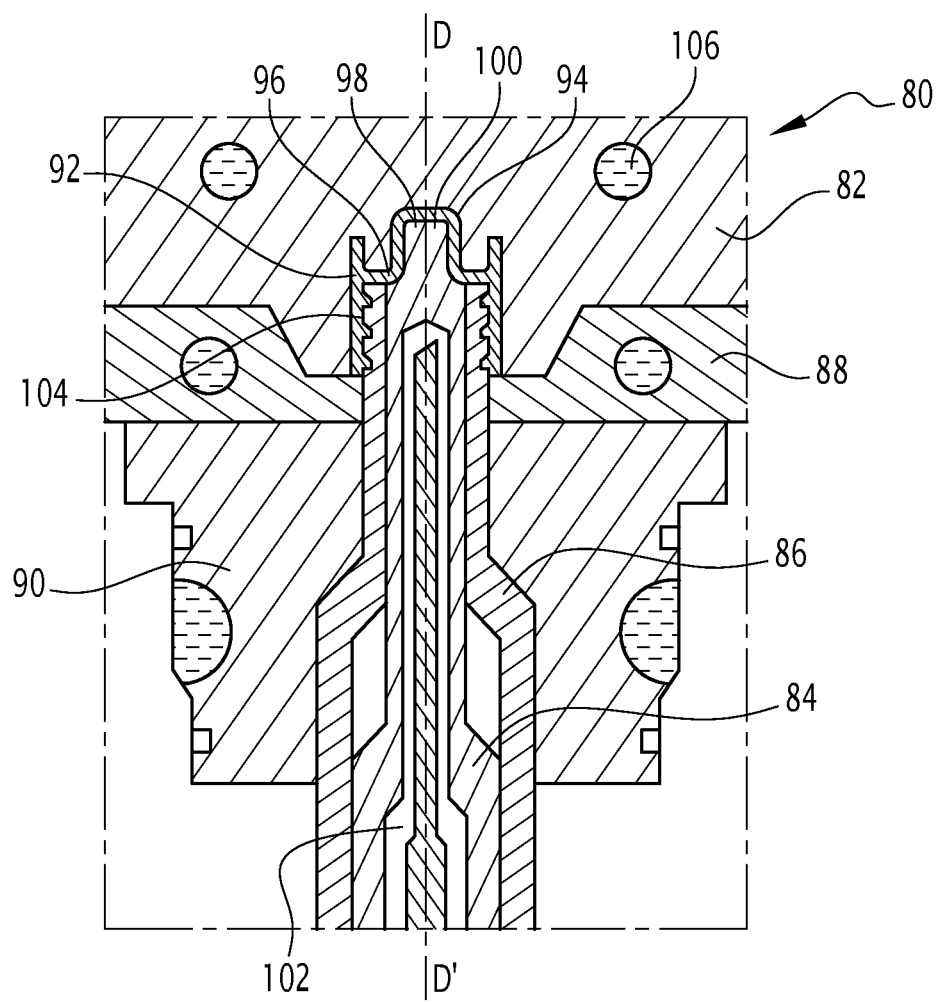
FIG. 4 is a schematic cross-section, along an axial midplane of the rod carrier molding device in FIG. 2.

As illustrated in FIG. 4, the central spindle 84 is disposed inside the threaded spindle 86, so as to define the lower face 96 of the molding cavity 92 together.

The central spindle 84 and the threaded spindle 86 are thus in thermal contact with one another, in particular to enable thermal conduction. Thus, cooling of the central spindle 84 by circulating a coolant in the channel 102 induces cooling of the threaded spindle 86.

The carriages 88 and the steady 90 are disposed around the spindles 84, 86, and in particular the threaded spindle 86, so as to hold the spindles 84, 86 in position during molding.

The carriages 88 are movable in translation along a perpendicular axis to the central axis D-D' and the steady 90 is movable in translation along the central axis D-D'.

The fluid material present in the molding cavity 92 is capable of being cooled by thermal contact with the central spindle 84 and the threaded spindle 86 cooled by circulating a coolant in the channel 102 defined in the central spindle 84.

Moreover, cooling circuits 106 are defined in the die 82, the carriages 88 and steady 90 so as to cool the fluid material injected into the molding cavity 92 further.

A process for manufacturing a cosmetic product application member 16 according to the invention will now be described.

A rod carrier 40 is first manufactured according to the following process for manufacturing the rod carrier.

Firstly, a rod carrier molding device 80 as described above is provided.

The different components of the molding device 80 are arranged so as to define the molding cavity 92.

For this purpose, the die 82 is fastened in position. The spindles 84, 86 are then translated along the central axis D-D' in the direction of the die 82 so as to define the molding cavity 92. The carriages 88 and the steady 90 are disposed so as to hold the spindles 84, 86 in position.

Secondly, a fluid material intended to solidify is injected into the molding cavity 92, for example via a nozzle (not illustrated).

The injected fluid material is a thermoplastic material and more particularly a plastic material composed of a copolyester, which has been previously heated for example to a temperature greater than 240° C.

Preferably, the injected fluid material is composed of virgin PET, recycled PET or a combination of virgin PET and recycled PET, and preferably more than 90% recycled PET.

The process for manufacturing the rod carrier then comprises a step of solidifying the fluid material in the molding cavity 92 to form the rod carrier 40.

In this aim, the fluid material is cooled to reach a temperature less than 70° C., and more particularly less than 62° C. in its core.

For this purpose, a coolant circulates in the cooling circuits 106 defined in the die 82, the carriages 88 and the steady 90 so as to cool the molding cavity 92.

The coolant is for example cold water, particularly water at a temperature less than 40° C., particularly less than 15° C.

Furthermore, according to the invention, during the solidification step, the central spindle 84 is cooled by injecting a coolant into the channel 102 defined therein.

In order to increase the cooling, the coolant is advantageously injected continuously, for example in fountain form, such that the coolant present in the channel 102 always remains at a low temperature.

The threaded spindle 86 is cooled by thermal contact with the central spindle 84.

The upper ends 98, 104 of the two spindles 84, 86 are thus cooled and cool by thermal contact the fluid material present in the molding cavity 92 so as to solidify it.

This leads to precise manufacturing and rapid solidification of the cylindrical skirt 44, and in particular of the upper and lower parts.

The rod carrier 40 thus formed in the molding cavity 92 is then released from the molding device 80.

For this purpose, the steady 90 is translated along the central axis D-D' downward. The carriages 88 are then translated along a perpendicular axis to the central axis D-D' in a mutually opposite direction so as to release the spindles 84, 86. The die 82 and the two spindles 84, 86 are then translated along the central axis D-D', so as to release the rod carrier 40 formed by the cooled fluid material in the molding cavity 92.

The manufacture of a rod carrier 40 according to such a process for manufacturing the rod carrier has for example a cycle time between 20 seconds and 45 seconds.

The process for manufacturing the cosmetic product application member 16 comprises a step of providing a rod 38.

The rod 38 is for example previously molded flat by plastic injection and more particularly by injecting the same material as the rod carrier.

More particularly, a fluid material intended to solidify is injected into a molding cavity extending along a horizontal axis, so as to form on cooling the rod 38.

Figure 5:
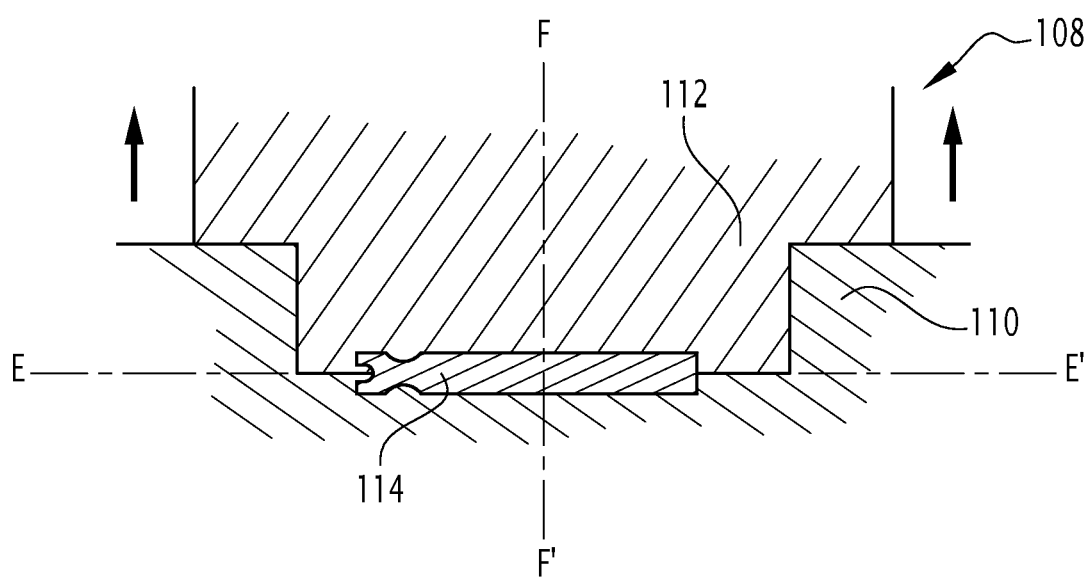
FIG. 5 is a schematic cross-section, along an axial midplane of the rod molding device in FIG. 2.

As illustrated in FIG. 5, the rod 38 is for example manufactured in a molding device 108 composed of a first shell 110 and a second shell 112 defining a molding cavity 114 therebetween.

The molding cavity 114 extends along a horizontal axis E-E'.

A fluid material intended to solidify is injected into the molding cavity 114, for example by a nozzle (not illustrated). Once the fluid material has solidified, the rod 38 thus formed in the molding cavity 114 extends along the horizontal axis E-E' corresponding to the rod axis C-C'.

The rod 38 is then released from the molding device 108.

For this purpose, at least one of the shells 110, 112 is moved in a direction opposite the other shell 112, 110 along a mold release axis F-F' perpendicular to the horizontal axis E-E'.

For example, the second shell 112 is moved upward as illustrated by the arrows in FIG. 5.

Unlike a mold release with a movement of the shell along the rod axis C-C', such a mold release by moving the shell(s) 110, 112 along a mold release axis F-F' perpendicular to the rod axis C-C' prevents adhesion of the material to the shell wall and therefore stretching of the rod 38 along the axis C-C' thereof.

The process for manufacturing the cosmetic product application member 16 then comprises a step of assembling the first end 70 of the rod 38 in the rod carrier 40.

More particularly, the first end 70 of the rod 38 is snap-locked in the rod carrier 40, and more specifically in the cylindrical skirt 44 of the rod carrier 40.

For this purpose, during the insertion of the rod 38 into the cylindrical skirt 44 of the rod carrier 40, the tenons 74 at the first end 70 of the rod 38 are elastically deformed so as to be housed in the retaining housing 66. Each tenon 74 then returns to the idle position thereof and thus remains locked in the retaining housing 66. Such shape cooperation locks the first end 70 of the rod 38 in position in the rod carrier 40.

Such an application member is manufactured from an easy-to-recycle material that has well-established industrial recycling processes.

Moreover, such an application member can be manufactured solely from recycled materials.

Such an application member is simple and inexpensive to manufacture. Indeed, a molding of the rod carrier comprising a cooling step by injecting a coolant into the channel 102 defined in the central spindle 84 offers the advantage of reducing the cooling time. Moreover, a snap-locking fastening of the rod carrier and the rod is simple and inexpensive.

Furthermore, such a cosmetic product packaging assembly 10, particularly when all the elements are manufactured from the same material, is advantageously easy to recycle.

The invention claimed is:

1. A cosmetic product application member comprising:
   a rod carrier;
   a rod defining a first end and a second end that are opposite; and
   characterized in that the first end of the rod is intended to be assembled in the rod carrier, the rod and the rod carrier being manufactured from a plastic material being composed of a copolyester; wherein the rod carrier comprises a screwing ring centered on a rod carrier axis (B-B') and defining an internal thread and a cylindrical skirt centered on the rod carrier axis, extending at least partially inside the screwing ring and intended to receive the first end of the rod.

2. The cosmetic product application member according to claim 1, wherein the plastic material is composed of virgin polyethylene terephthalate (PET), recycled PET or a combination of virgin PET and recycled PET.

3. The cosmetic product application member according to claim 1, wherein the first end of the rod is intended to be snap-locked in the rod carrier.

4. The cosmetic product application member according to claim 1, wherein the cylindrical skirt comprises a protuberance centered on the rod carrier axis (B-B'), protruding inside the cylindrical skirt and defining at least one retaining housing intended to receive at least one tenon arranged at the first end of the rod.

5. The cosmetic product application member according to claim 1, wherein the cylindrical skirt comprises longitudinal ribs arranged along at least a portion of an inner surface of the cylindrical skirt, the rod comprising at least one longitudinal protrusion capable of engaging between two adjacent longitudinal ribs of the cylindrical skirt.

6. A cosmetic product packaging assembly comprising:
   a receptacle intended to receive the cosmetic product and defining an opening;
   a cover intended to close the opening; and
   a cosmetic product application member according to claim 1, the rod carrier being intended to be fastened in the cover.

7. The cosmetic product packaging assembly according to claim 6, wherein the receptacle, the cover, the rod carrier and the rod are manufactured from the same material.

8. A process for manufacturing a rod carrier, the rod carrier being intended to be assembled with a rod to form a cosmetic product application member, the rod being manufactured from a plastic material being composed of a copolyester, the manufacturing process including the following steps:
   providing a rod carrier molding device comprising a die and a central spindle and defining a rod carrier molding cavity; and
   injecting a fluid material into the molding cavity; and
   solidifying the fluid material in the molding cavity to form the rod carrier;
   characterized in that the fluid material injected into the molding cavity is a copolyester, and wherein the rod carrier comprises a screwing ring centered on a rod carrier axis (B-B') and defining an internal thread and a cylindrical skirt centered on the rod carrier axis, extending at least partially inside the screwing ring and intended to receive the first end of the rod.

9. The process for manufacturing a rod carrier according to claim 8, wherein, during the solidification step, the central spindle is cooled by injecting a coolant into a channel defined inside the central spindle.

10. The process for manufacturing a rod carrier according to claim 8, wherein the molding device further comprises a threaded spindle; during the solidification step, the threaded spindle being cooled by thermal contact with the central spindle.

11. The process for manufacturing a rod carrier according to claim 8, wherein the injected fluid material is composed of virgin polyethylene terephthalate (PET), recycled PET or a combination of virgin PET and recycled PET.

12. A process for manufacturing a cosmetic product application member including the following steps:
   manufacturing a rod carrier according to the manufacturing process according to claim 8;
   providing a rod defining a first end and a second end that are opposite, the rod being composed of the same material as the rod carrier; and
   assembling the first end of the rod in the rod carrier.

13. The process for manufacturing a cosmetic product application member according to claim 12, wherein the first end of the rod is snap-locked in the rod carrier.

14. The process for manufacturing a cosmetic product application member according to claim 12, wherein the rod is previously molded flat.

15. The cosmetic product application member according to claim 2, wherein the first end of the rod is intended to be snap-locked in the rod carrier.

16. A cosmetic product packaging assembly comprising:
   a receptacle intended to receive the cosmetic product and defining an opening;
   a cover intended to close the opening; and
   a cosmetic product application member according to claim 2, the rod carrier being intended to be fastened in the cover.

17. A cosmetic product packaging assembly comprising:
   a receptacle intended to receive the cosmetic product and defining an opening;
   a cover intended to close the opening; and
   a cosmetic product application member according to claim 3, the rod carrier being intended to be fastened in the cover.

* * * * *